United States Patent [19]

Francis et al.

[11] Patent Number: 5,334,630

[45] Date of Patent: Aug. 2, 1994

[54] THIXOTROPIC COMPOSITIONS

[75] Inventors: Robert S. Francis; Murray R. Orpin, both of South Glamorgan, United Kingdom

[73] Assignee: BP Chemicals Limited, London, England

[21] Appl. No.: 752,730

[22] Filed: Aug. 30, 1991

[30] Foreign Application Priority Data

Sep. 1, 1990 [GB] United Kingdom ............ 9019143.8

[51] Int. Cl.$^5$ .......................... C08K 3/36; C08L 61/10
[52] U.S. Cl. ................... 523/216; 523/145; 524/492; 524/493; 524/594
[58] Field of Search ................ 523/145, 216; 524/492, 524/493, 594

[56] References Cited

U.S. PATENT DOCUMENTS

| Re. 32,889 | 8/1989 | Litke | 524/533 |
|---|---|---|---|
| 3,485,797 | 12/1969 | Rohms | 524/783 |
| 3,892,700 | 7/1975 | Burke, Jr. | 523/335 |
| 4,274,883 | 6/1981 | Lumbeck et al. | 524/492 |
| 4,574,097 | 3/1986 | Honeycutt | 523/209 |
| 4,692,479 | 9/1987 | Schneider et al. | 524/492 |

FOREIGN PATENT DOCUMENTS

| 0010635 | 4/1970 | Japan | 524/493 |
|---|---|---|---|
| 0789545 | 2/1979 | U.S.S.R. | 524/594 |
| 2180251 | 3/1987 | United Kingdom . | |

*Primary Examiner*—Paul R. Michl
*Assistant Examiner*—Andrew E. Merriam
*Attorney, Agent, or Firm*—Brooks Haidt Haffner & Delahunty

[57] ABSTRACT

This invention relates to a thixotropic laminating resin composition comprising an acid hardenable phenol-aldehyde resin, a highly dispersed hydrophobic amorphous silica and a viscosity modifier wherein the composition has a specified viscosity. Composites laminated with the above composition have improved dimensional stability and are resistant to combustion or smoke emission.

19 Claims, No Drawings

THIXOTROPIC COMPOSITIONS

The present invention relates to a thixotropic composition capable of surface lamination of shapes from phenol-aldehyde resins, especially glass reinforced phenol-aldehyde resins.

Phenol-aldehyde resoles are thermosetting resins and are conventionally prepared by reacting a molar-excess of an aldehyde, e.g. formaldehyde with phenol. Such resins are hardenable and may be used for producing shapes and moulds. The resins after shaping can be cured in the presence of acidic or alkaline catalysts. The resins may also be reinforced prior to shaping using strands or matrices of glass fibre and such products are the so-called glass reinforced phenolic resins.

It is known that shapes of glass reinforced phenolic resins prepared by conventional techniques, e.g. by hand lay up or spray deposition, have a tendency to exhibit the phenomenon known as "pin-holing" on the surface. This so-called "pin-holing" is caused by the slow loss of volatile gases/vapours generated during the strong acid catalysed thermosetting of the resin at elevated temperature.

The object of the present invention is to devise a suitable surface composition compatible with such resins and capable of being treated with suitable primers and top coats after demoulding so as to provide an excellent surface finish on the moulded product. Such products are also substantially free of pin-holing.

Accordingly, the present invention is a thixotropic laminating resin composition comprising:
a) an acid hardenable phenol-aldehyde resole,
b) a highly dispersed hydrophobic amorphous silica and
c) a viscosity modifier
said composition having a viscosity of 40–50 poise at 5 rpm and of 14–18 poise at 50 rpm measured at 25° C. using a Brookfield RVT instrument, spindle 4.

This composition may optionally contain a filler thereby altering the viscosity of the composition.

Thus, according to a further embodiment, the present invention is a thixotropic composition capable of surface lamination of shapes, said composition comprising:
a) an acid hardenable phenol-aldehyde resole,
b) a highly dispersed hydrophobic amorphous silica,
c) a viscosity modifier, and
d) a filler
said composition having a viscosity of 80–200 poise at 50 rpm and of 300–600 poise at 5 rpm measured at 25° C. using a Brookfield RVT instrument, spindle 7.

The components and the relative concentrations thereof in the laminating resin composition are substantially the same as that for the thixotropic surface composition referred to above except that no filler is present. The absence of the filler means that the viscosity of the laminating resin composition is in the range from 40 to 50 poise at 5 rpm measured at 25° C. as stated above and has a thixotropic ratio of 2.5–3.2.

In these compositions, the acid hardenable phenol-aldehyde resole is suitably a phenol-formaldehyde resole. The phenol-aldehyde resole in the thixotropic composition suitably has a viscosity of 2.5–3.7 poise at 25° C., a specific gravity of 1.22–1.23, a solids content of 65–70%, a pH of 7.3 to 7.8 and a free formaldehyde content of not more than 3.0%, preferably less than 2% by weight. The resole is suitably prepared by reacting a molar excess of an aldehyde e.g. formaldehyde, with phenol in the presence of an alkaline catalyst. The resole is suitably prepared by reacting the components at a temperature from 60° to 100° C. Examples of alkaline catalysts that may be used to prepare the resole include an alkali or an alkaline earth metal hydroxide e.g. sodium hydroxide or calcium hydroxide respectively.

The highly dispersed hydrophobic amorphous silica used in these compositions can be derived from conventional silicas which have been treated with a hydrophobic compound prior to use in the composition of the present invention. It may be sufficient to treat the surface of the silica with a hydrophobic compound to achieve the desired effect. The hydrophobic amorphous silica is preferably stable to acids, especially acids used in curing phenol-aldehyde resoles. Specific examples of highly dispersed hydrophobic amorphous silicas are the AEROSIL (Regd Trade Mark) type, especially AEROSIL R805, which is silica treated with a hydrophobic silane and has a surface grouping $C_8H_{17}(SiO_3)^{-3}$.

The amount of the hydrophobic amorphous silica used in the composition is suitably from 0.5–5% w/w, preferably from 1.5–4% w/w based on the total composition.

The resole is suitably mixed with one or more fillers selected from glass beads, alumina, china clay, siliceous earths, diatomaceous earths and mixtures thereof. The fillers suitably have a particle size from 10 nanometers to 75 micrometers, preferably from 7 to 60 microns.

The amount of filler, if present in the resole composition, is suitably from 5 to 150 wt %, preferably from 75 to 125 wt % based on the resole.

The thixotropic laminating resin compositions may also contain pigments which may be part of or in addition to the fillers referred to above. The pigment is suitably titanium dioxide, titanium coated mica, carbon black or any suitable non-toxic neutral coloured pigment capable of being adapted to tinting. A preferred pigment is titanium coated mica which can be used in amounts from 0.5 to 15% w/w of the total composition. Compositions containing such pigments have a potential for absorbing UV light of over 99% at about 5–10% loading in polymer matrices. Where titanium dioxide is used as the pigment the loading is suitably in the region of 50–100% w/w, preferably 60–80% w/w in a resole of 250–300 centipoise viscosity. Such a loading provides the basic opacity which can be further tinted with colours by using coloured pigment masterbatches. In such compositions, the coloured pigment content is suitably in the range from 0.1 to 5% w/w depending upon the tint desired.

The pigmented compositions can be used in a manner identical to those where the pigment is absent and do not have any adverse effect on their fire resistance, smoke emission or resistance to combustion.

The thixotropic resole composition is suitably used in the form of a paste. The paste can be formed by adding to the resole/filler mixture a viscosity modifier. Examples of the type of viscosity modifiers that may be used are BYK-W980 (which is a proprietary product sold by BYK-Chemie GmbH and is a salt of polyamino amides and an acid ester dissolved in 2-butoxy ethanol) and fatty alcohol alkoxylates, especially ethoxylates, and mixtures thereof. Alkoxylates of $C_{10}$–$C_{12}$ straight chain fatty alcohols suitably containing a preponderance of $C_{10}$ alcohols are preferred as modifiers. A particularly suitable source of such alcohols is that synthesised from petroleum-based feedstock. The alkoxylates suitably have 1-10 alkoxy, preferably ethoxy units. A most preferred modifer is a 90% w/w aqueous solution of an ethoxylate of a $C_{10}$-$C_{12}$ straight chain fatty alcohol containing 85% $C_{10}$ alcohols and derived by condensing said alcohol with 5 moles of ethylene oxide. Such a product is commercially available as EMPILAN KA590 (Regd Trade Mark, ex Albright & Wilson).

The amount of viscosity modifier used is suitably from 0.2-2.5%, preferably from 0.5-2.0% by weight of the total thixotropic composition. The viscosity of the thixotropic surface composition at 25° C. measured by the Brookfield RVT instrument above is preferably from 300-600 poise, spindle 7, at 5 revolutions per minute.

The thixotropic surface composition is kept free of the acid hardener during storage.

The acid hardener used is suitably selected from mineral acids and organic acids, e.g. sulphuric acid, an alkyl- or aryl-sulphonic acid or a compound capable of giving rise to an acid under hydrolysis conditions e.g. an acyl halide.

In use, the mould is prepared to a prearranged pattern of the shaped laminated composite. The surface of the mould is first treated with conventional sealer and mould release agents. Thereafter the thixotropic surface composition is mixed with a hardener, suitably 5-15% by weight thereof and applied as a thin coat to the mould surface. The surface composition may be applied as a spray coating.

Thereafter it is preferable to allow the thixotropic surface composition in the mould to partially cure for a short period, e.g. 5-60 minutes at a temperature below 85° C., preferably ambient to 60° C. before building thereon layers of conventional fibre reinforced, phenol-formaldehyde resin which forms the main body of the shaped laminated composite combined with an acid hardener. The fibre reinforced phenol-aldehyde resin forming the main body of the shaped laminated composite is suitably derived from a phenol-aldehyde resole which may be the same as or different from the resole used in the thixotropic surface composition. It is preferable that the resole used in the main body of the composite has the following characteristics: a viscosity from 1.2-31 poise, preferably from 5-20 poise at 25° C., a specific gravity from 1.22-1.24; a pH from 7.3 to 7.8, and a maximum free formaldehyde content of up to 3% by weight.

The fibre-reinforcement may be in the form of chopped strands, a mat formed from bonded, woven or compressed fibres, or a combination thereof. The fibre reinforcement in the main body resin is suitably of glass. The proportion of the fibre reinforcement to the resole resin in the main body of the shaped laminated composite is suitably from 1:4 to 4:1 by weight, preferably from 1:2 to 2:1 by weight. The layers of the main body fibre-reinforced resin can be built upon the partially cured thixotropic surface composition by hand lay, spray or other conventional techniques.

The whole composite shape can be cured in the mould for up to 40 hours, preferably for 1-24 hours at elevated temperature. The curing is suitably carried out in two stages, e.g. for up to 16 hours at 40°-80° C. before removal from the mould and for a further 2-16 hours at 40°-100° C. as final post curing.

Thus, according to yet another embodiment, the present invention is a method of preparing in a mould of prearranged pattern a shaped laminated composite from a fibre-reinforced phenol-aldehyde resole, said method comprising:

(A) applying as a thin coat on the mould surface a thixotropic surface composition comprising:
  (a) an acid hardenable phenol-aldehyde resole,
  (b) a highly dispersed hydrophobic amorphous silica,
  (c) a viscosity modifier, and
  (d) a filler said composition having a viscosity of 80-200 poise at 50 rpm and of 300-600 poise at 5 rpm measured at 25° C. using a Brookfield RVT instrument, spindle 7;

(B) allowing the thixotropic composition to partially cure at ambient to elevated temperature;

(C) applying on the partially cured surface from (B) above one or more layers of a fibre reinforced phenol-aldehyde resole, which forms the main body of the shaped composite and which may be the same as or different from the phenol-aldehyde resole forming the thixotropic composition, admixed with an acid hardener, (D) curing in the mould the composite resulting from steps (A) to (C) above in one or more stages at ambient and/or elevated temperature, and (E) recovering the shaped laminated composite from the mould.

The above embodiment can be typically performed using a thixotropic surface composition which has a filler content above 35% by weight of the total thixotropic surface composition. However, if the filler content of the thixotropic surface composition is lower, e.g. below 35I by weight, then it is preferable to place on the thin coating of the surface composition already applied on the mould a fibrous reinforcement prior to building thereon layers of the main body resin. By "fibrous reinforcement" is meant here and throughout the specification a wettable tissue-like reinforcement which may be formed from strands of a woven or compressed fibrous material glass fibres.

Where an intervening layer of a fibrous reinforcement is placed on the thin coat of the thixotropic surface composition in the mould, the fibrous reinforcement is preferably impregnated thoroughly with the surface composition. This may be achieved by brushing or by using a roller or by spraying a solution/suspension of the composition.

The shaped, laminated product resulting from the above does not experience any change in the chemical or mechanical resistance properties of the main body glass fibre reinforced phenolic resin composite. For example the volume of smoke generated during combustion of such a surface coated product is not measurably greater than that of the base composite formed from the main body glass fibre reinforced resin alone. The use of the surface coating gives a product which is substantially free of defects e.g. pin-holing, and requires minimal additional processing prior to priming and top coating. The adhesion of primer and top coat to the surface is also excellent.

The present invention is further illustrated with reference to the following Examples.

EXAMPLE 1

A thixotropic surface coating composition comprising a mixture of catalysed phenol formaldehyde resole which was filled with a mixture of various fillers (as shown below) and a viscosity modifier was prepared as follows:

The phenol aldehyde resin used to form the thixotropic surface composition had the following characteristics:

Resole: Phenol-formaldehyde (Phenol to formaldehyde mole ratio 1:1.6)
Viscosity at 25° C.: 2.45–3.7 poise 25° C.
Specific gravity: 1.223
pH: 7.4
Free formaldehyde: 2.5% wt The above resole was mixed in a high shear mixer with the fillers and viscosity modifier in the following proportions:

| | |
|---|---|
| Resole resin | 100 parts by weight |
| Glass spheres of average particle diameter 15 micrometers | 110 parts by weight |
| Aerosil* R805 highly dispersed amorphous silica, of average primary particle diameter 12 nanometers | 2.0 parts by weight |
| EMPILAN* KA590 synthetic fatty alcohol ethoxylate viscosity modifier | 2.0 parts by weight |

*Registered Trade Mark.

The composition at 25° C. had a measured viscosity by the Brookfield RVT instrument using spindle 7 of 440 poise at 5 rpm and 130 poise at 50 rpm.

EXAMPLE 2

A mould was prepared to a prearranged pattern of the shaped laminated composite. The surface of mould was abraded to give a smooth, matt aspect and then treated with a release agent. This further helps to minimise surface defects. The surface composition of Example 1 above with 2.5% by weight of a Phencat 15 (Registered Trade Mark, ex-Libra Chemicals) catalyst, which is a mixture of xylene sulphonic acid and phosphoric acid, was applied by brush as a thin coat (0.3–0.4mm) on the mould surface giving a coverage of 550+/−50 gm$^{-2}$. This coating was allowed to partially cure by transferring the mould to an oven at 60° C. for 20 minutes after which the paste felt hard upon touching. Three layers of 450 gm$^{-2}$ chopped strand mat and finally one layer of 30 gm$^{-2}$ glass tissue were then laminated into the mould behind the paste using a phenol-formaldehyde resole catalysed with 6% w/w Phencat 10 (Regd Trade Mark, ex Libra Chemicals) which is an aqueous mixture of p-toluene sulphonic acid and phosphoric acid. The phenol-formaldehyde resole had the following properties:

| | |
|---|---|
| Phenol to formaldehyde mole ratio = | 1:1.6 |
| Viscosity at 25° C. = | 6–7.5 poise |
| Specific Gravity = | 1.233 g/ml |
| pH = | 7.6 |
| Free formaldehyde = | 2.3% w/w |

A resin to glass ratio of 2:1 was required. The whole composite was cured for 3 hours at 60° C. before demoulding. Post-curing was carried out at 60° C. for 4 hours.

EXAMPLE 3

Using a shaped mould as in Example 2, the surface paste composition described in Example I was applied by spray as follows:

The surface paste was diluted with 7% w/w acetone and catalysed with 4% w/w Phencat 10. At ambient temperature upto 25° C. this mixture was found to maintain a steady viscosity of 30+/−5 poise on a Brookfield RVT instrument, spindle 3 at 20 rpm over a period of 60 minutes with a maximum temperature rise of 5° C. in the pot. At this viscosity, the mixture was successfully sprayed through a standard gravity-feed spray gun. Four spray passes over the mould were used to give a coating thickness and coverage similar to that stated in Example 2 above.

The surface paste thus applied was partially cured for 25 minutes at 60° C. prior to completion of the laminate as described in Example 2 above. Use of this technique for applying the surface paste gave the advantages of considerably shortened application time combined with improved consistency of coating. Use of a flammable solvent was found to not impair the fire-resistance properties of the laminate to any significant extent.

EXAMPLE 4

A thixotropic laminating resin was prepared from a combination of a thixotroping agent and a viscosity modifier with a phenol-formaldehyde resole as follows:

Using the phenol-formaldehyde resole of Example 1 a thixotropic intermediate was prepared by high shear mixing of the resole with the ingredients shown below in the stated proportions in parts by weight:

| | |
|---|---|
| Resole resin | 100 |
| Aerosil R805 highly dispersed amorphous silicon dioxide, average primary particle size 12 nanometers | 3.0 |
| Empilan KA590 viscosity modifier | 1.25 |

This composition at 25° C. had measured viscosities using a Brookfield RVT instrument, spindle 6 of 250 poise at 5 rpm and 75 poise at 50 rpm.

The thixotropic laminating resin was then prepared by low shear blending for 30 minutes of 40% w/w of the above composition into a freshly prepared batch of the type of phenol-formaldehyde resole described in Example 2. The final thixotropic resin had the following viscosities as measured with a Brookfield RVT instrument, spindle 3 at 25° C.:

| | |
|---|---|
| 5 rpm | 4200 Cp |
| 50 rpm | 1520 Cp |

EXAMPLE 5

The thixotropic laminating resin described in Example 4 was used to prepare a shaped moulding out of phenolic GRP as described in Example 2 above. It was found that over a series of mouldings, it was possible to complete successful lamination with a 20–25% w/w saving in resin due to the thixotropy of the resin and its more rapid wet-out of the glass reinforcement because of the lower viscosity and the presence of a surfactant (viscosity modifier). These benefits also resulted in a faster lamination time.

EXAMPLE 6

The following Example illustrates a pigmented composition which is identical to the formulation procedure described in Example 1 above but with the following components:

| | |
|---|---|
| Resole resin | 100 parts by wt (pbw) |

-continued

| | |
|---|---|
| Glass spheres (as in Example 1) | 40 pbw |
| Titanium dioxide (TIONA* RCL 535, ex SCM Chemicals Ltd) | 70 pbw |
| Titanium coated mica (av particle size 5 micrometers, IRIODIN* 111, ex Merck Ind Chem) | 5 pbw |
| AEROSIL* R 805 | 2 pbw |
| EMPILAN* KA 590 | 2 pbw |
| Aq Carbon black concentrate (AQUARINE* BLACK TK ex Tennants Textile Colours Ltd) | 0.4 pbw |

* = Registered Trade Mark.

The resultant composition had a measured viscosity at 25° C. (Brookfield RVT, Spindle 6) of 320 Poise at 5 rpm and 90 Poise at 50 rpm.

Mouldings prepared from the thixotropic resin have been found to have improved dimensional stability since areas of resin richness are minimised. In fire-resistance testing, such mouldings have been seen to exhibit equal or better resistance to combustion or smoke emission when compared with standard resins.

Properties Derived from Use of Surface Paste

The use of the surface composition did not result in any reduction in mechanical or chemical resistance properties of the main body phenolic resin glass fibre reinforced composite. The volume of smoke generated during combustion was no greater than that of the composite from the main body glass fibre reinforced resin alone. Use of the thixotropic surface composition gave a surface which was free of defects and required no further processing before priming and top coating. Adhesion of the thixotropic surface composition to the main body glass fibre reinforced composite in the laminate was excellent.

We claim:

1. A thixotropic laminating resin composition comprising:
   (a) an acid hardenable phenol-aldehyde resole,
   (b) a highly dispersed hydrophobic amorphous silica present in the composition in an amount from 0.5–5% w/w based on the total composition, and
   (c) A viscosity modifier, said composition having a viscosity of 40–50 poise at 5 rpm and of 14–18 poise at 50 rpm measured at 25° C. using a Brookfield RVT instrument, spindle 4.

2. A thixotropic laminating resin composition capable of surface lamination of shapes, said composition comprising:
   (a) an acid hardenable phenol-aldehyde resole,
   (b) a highly dispersed hydrophobic amorphous silica present in the composition in an amount from 0.5–5% w/w based on the total composition,
   (c) a viscosity modifier, and
   (d) a filler,
said composition having a viscosity of 80–200 poise at 50 rpm and of 300–600 poise at 5 rpm measured at 25° C. using a Brookfield RVT instrument, spindle 7.

3. A thixotropic composition according to claim 1 wherein the phenol-aldehyde resole has a viscosity of 2.3–3.7 poise at 25° C., a specific gravity of 1.22–1.23, a solids content of 65–70%, a pH of 7.3–7.8 and a free aldehyde content of not more than 3.0% w/w.

4. A thixotropic composition according to claim 1 wherein the phenol-aldehyde resole is a phenol-formaldehyde resole.

5. A thixotropic composition according to claim 1 wherein the highly dispersed hydrophobic amorphous silica is stable to acids used to cure the phenol-aldehyde resin.

6. A thixotropic composition according to claim 5 wherein the highly dispersed hydrophobic amorphous silica is a conventional silica treated with a hydrophobic compound prior to use in the composition.

7. A thixotropic composition according to claim 6 wherein the hydrophobic compound used to treat the silica is a hydrophobic silane and the treated silica has a surface grouping $C_8H_{17}(SiO_3)^{-3}$.

8. A thixotropic composition according to claim 1 wherein the viscosity modifier is selected from
   a) a salt of a polyaminoamide and an acid ester,
   b) a fatty alcohol alkoxyether and
   c) mixtures of (a) and (b).

9. A thixotropic composition according to claim 8 wherein the viscosity modified is an alkoxyether of $C_{10}$–$C_{12}$ straight chain fatty alcohols.

10. A thixotropic composition according to claim 8 wherein the alkoxyethers have 1–10 alkoxy units.

11. A thixotropic composition according to claim 8 wherein the alkoxyethers compromise ethoxy units.

12. A thixotropic composition according to claim 1 wherein the viscosity modifier is a 90% w/w aqueous solution of an ethoxylate of a $C_{10}$–$C_{12}$ straight chain fatty alcohol containing 85% $C_{10}$ alcohols condensed with 5 moles of ethylene oxide.

13. A thixotropic composition according to claim I wherein the viscosity modifier is present in the composition in an amount from 0.2–2.5% w/w.

14. A thixotropic composition according to claim 2 wherein the filler is present in the composition in an amount from 5–150% w/w based on the resole.

15. A thixotropic composition according to claim 2 wherein the filler is selected from glass beads, alumina, china clay, siliceous earths, diatomaceous earth and mixtures thereof.

16. A thixotropic composition according to claim 2 wherein the filler has a particle size ranging from 10 nanometers to 75 micrometers.

17. A thixotropic composition according to claim 1 wherein said composition further comprises an acid hardener.

18. A thixotropic composition according to claim 2 wherein said composition further comprises an acid hardener.

19. The composition of claim 8 wherein said phenol-aldehyde resole has a viscosity of 2.3–3.7 pose at 25° C., a specific gravity of 1.22–1.23, a solids content of 65–70%, a pH of 7.3–7.8 and a free aldehyde content of not more than 3.0% w/w.

* * * * *

UNITED STATES PATENT AND TRADEMARK OFFICE
CERTIFICATE OF CORRECTION

PATENT NO. : 5,334,630
DATED : August 2, 1994
INVENTOR(S) : Robert S. Francis, et al.

It is certified that error appears in the above-indentified patent and that said Letters Patent is hereby corrected as shown below:

Col. 4, l. 39, after "material" and before glass insert --e.g.--.

Signed and Sealed this

Twentieth Day of December, 1994

Attest:

BRUCE LEHMAN

Attesting Officer      Commissioner of Patents and Trademarks